United States Patent [19]

Kafka

[11] Patent Number: 5,086,585
[45] Date of Patent: Feb. 11, 1992

[54] SUBSTRATE FOR OUT-OF-GROUND CULTIVATION AND METHOD FOR THE PRODUCTION THEREOF

[75] Inventor: Bernard Kafka, Rantigny, France

[73] Assignee: Isover Saint-Gobain, Courbevoie, France

[21] Appl. No.: 493,804

[22] Filed: Mar. 15, 1990

[30] Foreign Application Priority Data

Mar. 15, 1989 [FR] France .................. 89 03372

[51] Int. Cl.⁵ ............................................. A01G 31/00
[52] U.S. Cl. ........................................... 47/64; 47/58; 47/87
[58] Field of Search ............... 428/280, 282, 285, 297, 428/298, 302, 903; 47/64, 87, 58

[56] References Cited

U.S. PATENT DOCUMENTS

| | | | |
|---|---|---|---|
| 4,058,931 | 11/1977 | Vestergaard | 47/64 |
| 4,777,763 | 10/1988 | Shannon et al. | 47/74 |
| 4,826,722 | 5/1989 | Debouzie et al. | 428/280 |
| 4,879,172 | 11/1989 | Meunier | 428/280 |
| 5,009,030 | 4/1991 | Kafka et al. | 47/64 |

FOREIGN PATENT DOCUMENTS

| | | | |
|---|---|---|---|
| 133083 | 2/1985 | European Pat. Off. | |
| 62-220128 | 9/1987 | Japan | 47/81 |
| 8700394 | 1/1987 | PCT Int'l Appl. | |
| 8901736 | 8/1988 | PCT Int'l Appl. | |

Primary Examiner—James J. Bell
Attorney, Agent, or Firm—Oblon, Spivak, McClelland, Maier & Neustadt

[57] ABSTRACT

A substrate for out-of-ground cultivation is made of a felt of mineral fibers obtained by continuous longitudinal compression, at a rate between 1.5 and 15, of a sheet of mineral fibers in which the fibers are arranged in layers or strata parallel to the upper and lower faces of this sheet. The compression takes place before the heat treatment of the sheet for setting the binder.

6 Claims, 3 Drawing Sheets

FIG_3

SUBSTRATE FOR OUT-OF-GROUND CULTIVATION AND METHOD FOR THE PRODUCTION THEREOF

BACKGROUND OF THE INVENTION

1. Field of the Invention

The invention relates to a substrate for out-of-ground cultivation that exhibits satisfactory properties for the cultivation of plants, and a method for its production.

2. Background of the Related Art

It is important, for the growth of the plants, that the substrate contain air and can absorb and hold water or nutritive aqueous solutions.

For out-of-ground cultivation, substrates made of a felt of mineral fibers, such as mineral or glass wool, have been proposed because these substrates exhibit the advantage of being very porous, the fibers generally occupying at most 5% of the total volume of the substrates. They can serve as a support for the roots, and contain a reserve of air and water or nutritive solution; on the other hand, they are light and chemically inert.

It is known that different substrates are necessary for the cultivation of plants and that their construction depends on the state of growth of these plants. Actually, as the development of the plants proceeds, the substrates must have a greater volume and a structure that makes it possible to offer to them the elements they need (water, air, nutritive solutions) and sufficient space for the development of the roots.

Currently, greenhouse out-of-soil cultivation comprises at least two stages. The first corresponds to the growth of the seedlings and requires substrates often called cubes that are not very bulky, the plant root system being not very developed. During the second stage, substrates of small volume are placed on substrates of larger volume, also called "slabs," to allow a more complete development of the roots and a good growth of the plants. The "slab" substrates generally carry several small substrates known as "cubes."

This invention relates more particularly to this second category of substrate (the "slabs") which not only must offer the plants sufficient volume for the development of the roots but also the amount of water and air necessary for their growth, and this for several plants.

The retention of water, or hydroretentivity, of a substrate is an important characteristic for conducting the cultivation of the plants. Moisture conditions can vary depending on various factors such as the type of plants to be cultivated, the climate, the seasons, the stage of development of the plant. Regardless of the moisture conditions desired for a particular type of substrate, it is necessary that the water be absorbed and held to a certain extent by the substrate: it must not drain off immediately, but must remain available for the plant. Actually, water or another solution too firmly bonded to the substrate, or that drains off too quickly, cannot be used by the plant under normal conditions.

It is known that hydroretentivity is connected to the capillary action of the felt constituting the substrate. The capillary action depends on the diameter of the fibers, therefore on their fineness, and on the density of the felt obtained from these fibers.

For a given density, the hydroretentivity of a felt increases with the fineness of the fibers. With felts which contain fibers of the same average diameter, the hydroretentivity increases when the density increases.

Depending on the type of the plants to be cultivated, it can be advantageous to use substrates of different structures in which it is possible to cause the density and the diameter of the fibers to vary.

For example, a substrate exhibiting a high water retention should contain fibers of small diameter and exhibit a high mass.

If, for a good growth, the plant needs water, it also requires air. Substrates of high density, which exhibit good water retention, useful for the plant, have an air reserve which can be insufficient.

To increase the ability to aerate the roots contained in the substrate, it is possible, for example, to form air passages in the substrate by making holes extending into the substrate. It is also possible to decrease the density of the substrate, considering the fact, however, that a decrease in density causes a decrease in water retention.

However, the presence of holes in the substrate or else a low density can reduce the mechanical strength of the substrate. In particular, when a substrate of low density (to increase its air reserve) comprises fibers of small diameter, which makes it possible to increase the phenomenon of capillary action and, consequently, the hydroretentivity of the substrate, its mechanical strength is reduced. When they have been soaked with water, these substrates can sag, and this all the more when the substrate is used as a "slab" carrying several "cubes." The losses in thickness which result cause a reduction of the air reserve and these losses in thickness are all the higher as the substrate has a lower density and fibers of smaller diameter.

An effort has therefore been made to produce substrates for out-of-ground cultivation which exhibit sufficient mechanical strength to undergo minimum sagging during hydration while exhibiting a water retention and an air reserve that are sufficient for a good development of the roots and a satisfactory growth of the plants.

SUMMARY OF THE INVENTION

The invention has as an object a substrate for out-of-ground cultivation having the above properties and a method for its production.

The substrate for out-of-ground cultivation, according to the invention, is made of mineral fibers connected by a thermally cross inked resinous binder and consisting of a felt of such mineral fibers. The felt is obtained by at least one continuous longitudinal compression, at a ratio between 1.5 and 15, of a sheet of mineral fibers in which the fibers originally have a tendency to be arranged in layers or strata parallel to the upper and lower faces of this sheet, the compression taking place before the heat treatment of the sheet serving to crosslink the binder.

The continuous longitudinal compression may be provided by subjecting the sheet of mineral fibers that is used to produce the felt, before the heat treatment to crosslink the binder, with at least one continuous compression by passage between pairs of conveyors delimiting its upper and lower faces, the speed of each pair of conveyors being less than that of the pairs of preceding conveyors.

By "ratio of compression" is meant the ratio of the mass of fibers per surface unit after and before compression.

The sheet of mineral fibers is made, as is usual in the production of insulating fibrous products, by depositing of mineral fibers conveyed by a gas current on a conveyor belt which is permeable to gas and holds the fibers. The fibers are deposited in the form of strata that are almost parallel to the plane of the conveyor belt and in which they have a random orientation. The lower face of the sheet results from the compressing of the fibers on contact with the belt, which are therefore deposited almost parallel to this face.

The compression treatment corresponds to a crimping of the sheet of mineral fibers which then exhibits, in its thickness along a longitudinal section corresponding to the direction of displacement of the sheet on the conveyor belt, small loops or tangled crimps, except in the surface layers. These small crimps can be observed as a slight variation in color of the fibers due to the presence of the binder.

The rate of compression applied to the sheet of mineral fibers depends on the quality of the fibers, particularly on their diameter. For a substrate according to the invention, this rate is greater than 1.5 because, for a lower rate, the crimping is insufficient to obtain a significant degree of small crimps which impart to the substrate a high mechanical strength and a possibility of better development of the roots in the thickness of the substrate. The rate of compression is preferably less than 7 and it is preferably about 4 to 5.

Along with the longitudinal compression, it is possible to also provide a compression in the direction of the thickness, which can be performed continuously and, preferably, gradually.

When the felt has a wetting agent, which is the case when it intrinsically does not exhibit a sufficient hydrophilic characteristic, this agent can be introduced in a way known in the art, for example as described in EP-A-099 801.

The substrate according to the invention exhibits an improved mechanical strength. In particular, it is more resistant to sagging when it is soaked with solution.

On the other hand, depending on the desired cutting direction of the treated sheet to form the substrates, there may be provided a 90° rotation of the substrates about a longitudinal axis, thus changing the respective directions of the faces of the felt in the substrate. It is thus possible to alter the structural characteristics depending on the directions considered. For example, the rotation may be provided to promote the development of the roots in the entire felt thickness, since the tangled crimps may prevent their rapid progression in the downward direction. This is particularly observed with substrates resulting from a crosswise or longitudinal cutting in relation to the direction of displacement of the sheet on the conveyor belt.

The felts of mineral fibers that are useful as substrates for out-of-ground cultivation preferably have densities less than 60 kg/m$^3$ and, in particular between 15 and 30 kg/m$^3$, and contain fibers of diameter generally between 2 microns and 12 microns and, advantageously, less than 8 microns, to exhibit a hydroretentivity that is satisfactory for the growth of plants. A substrate having a suitable hydroretentivity for the cultivation of plants contains at least about 50% water, for a suction of 10 cm of water. To determine the amount of water that a substrate retains, called hydroretentivity, it is subjected, after having soaked it with water, to suction forces and its water content is determined as a function of these forces. Thus, for a given suction, expressed in centimeters of water, (i.e., 10 cm), the volume of water which is contained in the substrate and which represents a certain percentage of the volume of the substrate is defined.

DETAILED DESCRIPTION OF THE PREFERRED EMBODIMENTS

Figure 1:
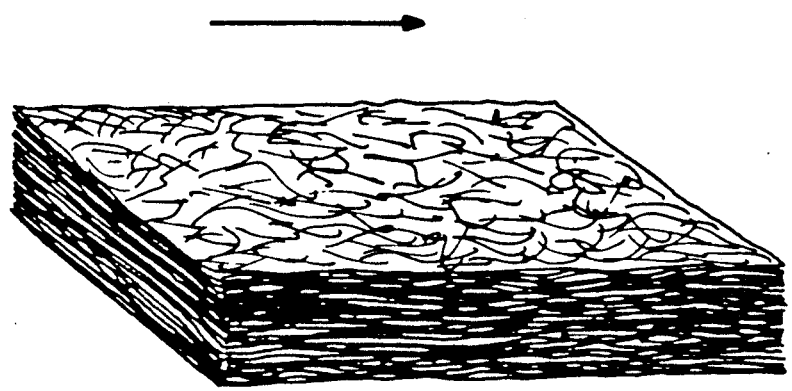
FIG. 1 diagrammatically shows in perspective a section of a control sample of felt obtained without longitudinal compression.

As FIG. 1 shows, the fibers of a conventional felt which has undergone only a compression in the direction of the thickness, are arranged parallel to the faces of the felt. The arrangement of the fibers is approximately the same when the felt considered in either the longitudinal direction, designated by the arrow, or in the crosswise direction (in relation to the conveyor belt on which the felt is constituted). This type of felt is easily compressed in the direction of the thickness, particularly for low felt densities.

Figure 2:
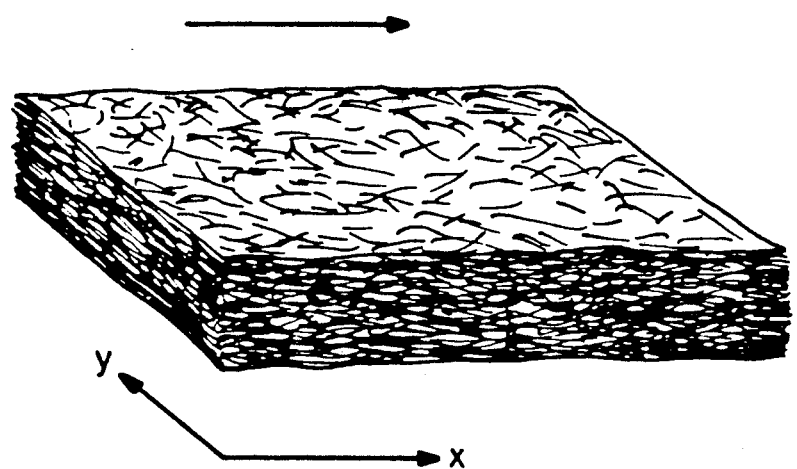
FIG. 2 diagrammatically shows in perspective a section of a sample of felt obtained with longitudinal compression and useful as a out-of-ground substrate, according to the invention in which longitudinal x and crosswise y cutting directions have been indicated.

FIG. 2 shows a felt that has undergone a longitudinal compression before the heat treatment that is used to crosslink the binder composition. Longitudinally, small loops or tangled crimps result; the fibers are arranged in random directions. Crosswise, the dominant position of the fibers typically remains parallel to the upper and lower faces of the felt. This structure, as previously indicated, makes possible a significant development of the roots in the entire thickness of the substrate and a better mechanical strength.

A process to make a sheet of mineral fibers, useful in forming a substrate for out-of-ground cultivation according to the invention (except for the longitudinal compression), is described for example in European patent application A-133 083. The sheet of mineral fibers is formed by the depositing of fibers on a conveyor belt.

A binder composition is applied to the fibers during their path to the conveyor belt. The sheet, optionally compressed in the direction of thickness, is subjected to at least one continuous longitudinal compression by passage between pairs of conveyors, the speed of each pair of conveyor diminishing in the direction of displacement of the sheet. The sheet is then treated thermally to crosslink the binder and set the structure of the felt.

Figure 4:
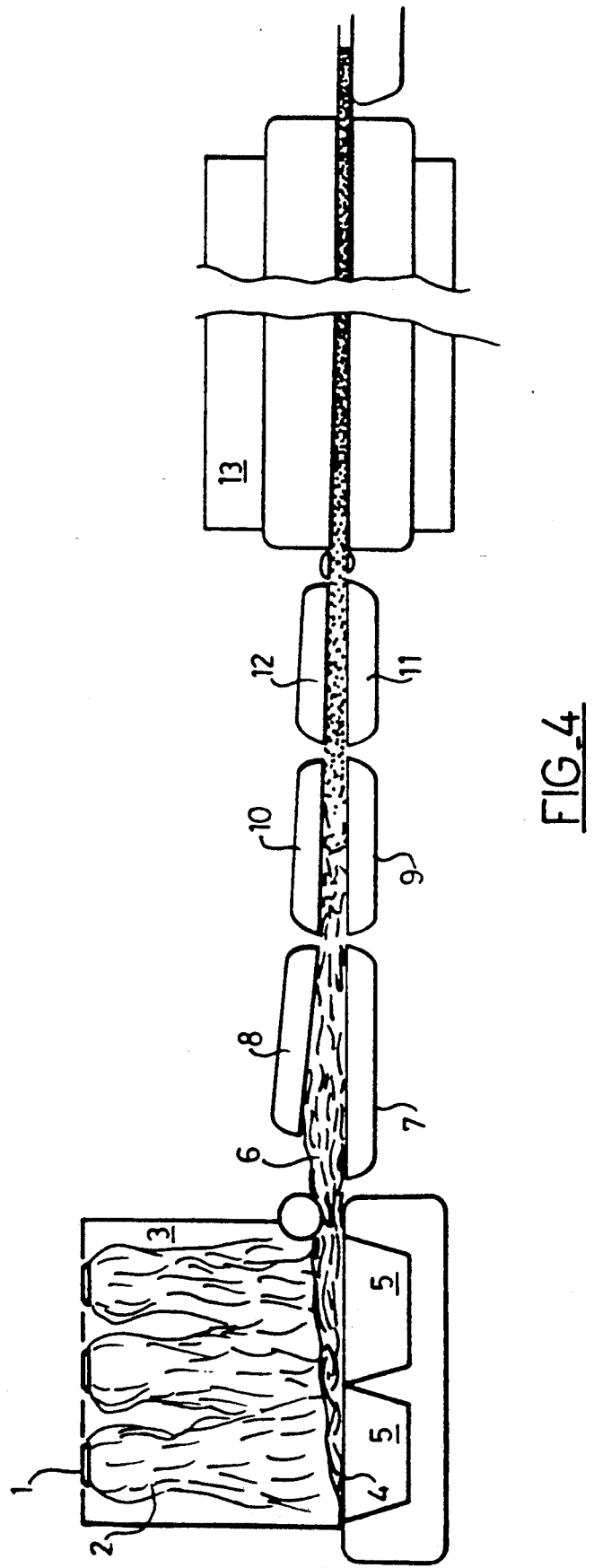
FIG. 4 schematically illustrates an installation that can be used to make felts useful as out-of-ground substrates according to the invention.

FIG. 4 schematically illustrates a diagram of an installation that can be used to produce felts of mineral fibers useful as a substrate for out-of-ground cultivation, based on a felt and described (except for the longitudinal compression) in European patent application EP-A-133 083.

This device has three quite distinct parts, one in which the sheet is formed from fibers, one in which the sheet is compressed longitudinally and finally one in which the sheet is treated thermally to crosslink the binder.

The installation for formation of the fibers has three centrifuging devices (1). The formation of the fibers is not connected to any particular method. The method to which reference is made (EP-A-133083) is only the one which, on an industrial level, is the most widely used for the formation of glass fibers, but other methods are also possible, particularly those used ordinarily for the formation of mineral wool and which have a group of centrifuging wheels on the peripheral wall, on which the material is accelerated and thrown in the form of fibers.

Three centrifuging devices (1) are mounted in series. In large installations, the number of centrifugers can reach or exceed a dozen.

The fibers produced by each of centrifuging devices (1) originally form an annular web (2). They are entrained by gas currents toward the lower part of reception chamber (3) where a conveyor belt (4) that is permeable to gas and that holds the fibers is located. The circulation of the gases is provided by a suction maintained under conveyor belt (4) from boxes (5) under a partial vacuum in relation to the atmosphere of chamber (3).

The fibers are deposited on the conveyor belt in a thickness which steadily increases up to the outlet of the reception chamber.

Inside the chamber, means (not shown) spray a liquid composition of binder on the fibers.

Sheet (6) leaving chamber (3) is ordinarily relatively light. Its average density is low for a large thickness. Furthermore, because of the method of formation of the sheet, the fibers are deposited in the form of strata extending almost parallel to the plane of the conveyor belt within which strata they have random orientation. Through a series of modifications, this sheet will be brought to have a very considerably increased density and to a different orientation of the fibers.

These modifications can include a compression of the sheet in the direction of the thickness. This compression can be obtained, for example as is shown in FIG. 4, by having sheet 6 pass between two conveyors (7) and (8). The distance separating the two conveyors preferably steadily decreases gradually in the direction of advance of the sheet, to avoid damaging the fibers.

The compression in the direction of the thickness of the sheet can, however, occur over the entire path of the sheet before the oven; it can vary gradually over the entire path of the sheet or be constant over a portion of the path, for example by keeping the distance constant between two conveyors that are opposite one another. It can vary also from one pair of conveyors to the next, and, for example, decrease then increase, depending on the compression effect desired.

The sheet then passes between pairs of conveyors (9, 10) and (11, 12), the speed of each pair being less than that of the pairs of preceding conveyors, which causes a continuous longitudinal compression of the sheet.

The sheet is then directly introduced into oven (13) where the heat treatment causes the crosslinking of the binder and the stabilization of the product.

At the outlet of oven (13), the felt obtained is cut in the x or y direction and packaged as a function of the intended uses. It may be rotated by 90° about a longitudinal axis prior to cutting.

The structure of the felt obtained depends on the density of the sheet of fibers and on its thickness. Regulating of the distance between two conveyors which are opposite one another makes it possible to set the density and the thickness, considering the initial thickness of the sheet at the outlet of reception chamber (3) and the thickness that the sheet must have at the intake of the oven (13).

The compression in the direction of the thickness of the sheet, associated with the longitudinal compression, makes it possible to form a felt which comprises upper and lower surface layers in which the fibers are oriented almost parallel to the plane of the conveyor belt. The lower surface layer results from the compressing of the fibers in contact with the conveyor belt. The upper surface layer results from compression in the direction of the thickness. The presence of these two surface layers contribute to the rearrangement of the fibers on the inside of the felt in random directions during longitudinal compression.

These felts, used as substrates for out-of-ground cultivation, promote, by the presence of these surface layers containing fibers oriented almost parallel to the plane of the conveyor belt, the spreading of the water or nutritive solution over the entire surface of the substrate.

The following, nonlimiting examples illustrate the invention.

The examples correspond respectively to a control substrate A, made from a felt which has not been compressed longitudinally (FIG. 1) and to a substrate B according to the invention, made from a felt which has been compressed longitudinally as shown in FIG. 2.

Substrates A and B are made of glass fibers with an average diameter equal to 6 microns.

Control substrate A consists of a felt of discontinuous glass fibers obtained in the usual way, i.e., the sheet of glass fibers formed on the conveyor belt is compressed in the direction of the thickness and heat-treated to form a felt. Its density is equal to 28 kg/m$^3$.

The felt from which substrate B according to the invention comes is produced by the process described in European patent application A 133 083 and further processed in an installation as shown in FIG. 4.

The speeds of the various conveyors are regulated to have a final longitudinal compression ratio of 4. The speed of the receiving element and of the first group (7, 8) of conveyors is 30 m/min. The speed of the second group (9, 10) of conveyors is 14 m/min, that of the third group (11, 12) 6 m/min. The displacement speed of the felt in the oven is 6 m/min. The distance between the two conveyors of the first group is constant and equal to 100 mm, that between the conveyors of the second group is 120 mm, and that between the conveyors of the third group 80 mm. After passage in the oven, a felt having a density of 22 kg/m$^3$ is obtained.

The nominal thickness of the two substrates A and B is 75 mm.

The resistance to compression of these two substrates is evaluated by examining their relative deformation (in %) as a function of a stress (in KN/m$^2$). See FIG. 3.

This test is performed by subjecting 0.16 m2 samples to different pressures by using an Instron 1195 dynamometer.

Figure 3:
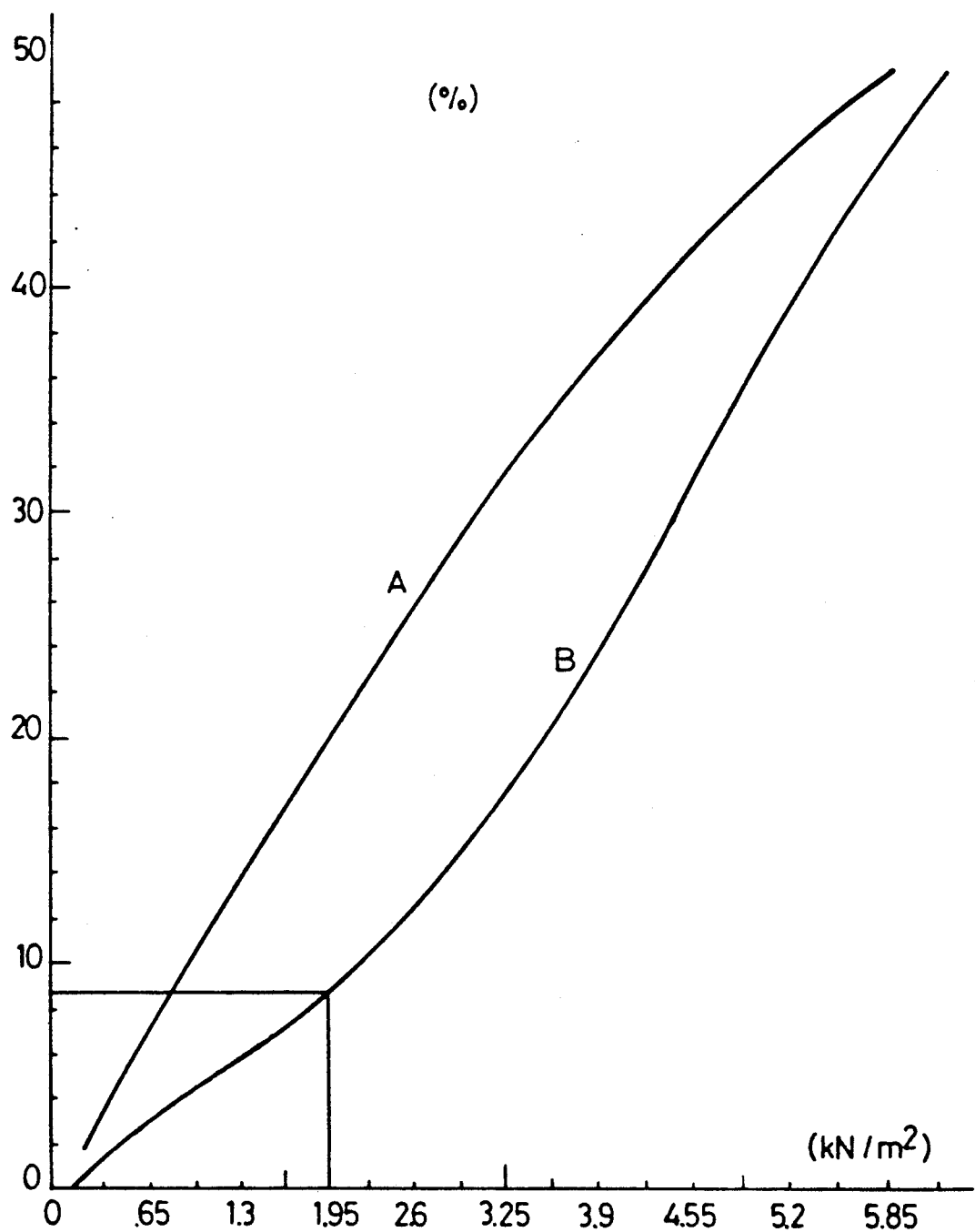
FIG. 3 illustrates the relative deformation curve (%) as a function of a stress (kN/m$^2$) applied to a control sample A obtained without longitudinal compression and to a sample B, useful as an out-of-ground substrate according to the invention, having undergone a longitudinal compression.

It can be seen, in FIG. 3, that, when subjected to the same stress, at least for the low values, control substrate A is deformed more than substrate B according to the invention, although it has a higher density (28 kg/m$^3$).

Substrate B, according to the invention, is therefore more resistant to compression, which makes it advantageously usable for out-of-ground cultivation. Actually, as has already been indicated, the fact that it is mechanically stronger makes it more resistant to sagging when it is soaked with water or solution. The substrate therefore better preserves the initial characteristics and, in particular, the air/water ratio necessary for a good development of the roots and a satisfactory growth of the plants. Further, substrates with improved mechanical strength can be obtained with low density felts (for example, 22 kg/m$^3$) and containing fibers with a relatively small average diameter (6 microns). Thus, this invention provides substrates that can be used as "slabs" that are able to receive several cubes, which not only contain a larger air reserve, but also exhibit a good hydroretentivity, characteristics which make a better development of the roots and a better growth of the plant possible.

What is claimed is:

1. Method for manufacturing substrate for out-of-ground plant cultivation, comprising the steps of:

continuously longitudinally compressing, by a ratio of between 1.5 and 15, a sheet of mineral fibers having a resinous binder, said fibers being generally arranged in layers parallel to faces of the sheet;

heat treating the compressed sheet to crosslink the binder; and causing plant roots to grow in said substrate.

2. Method according to claim 1, wherein said step of continuous longitudinal compression is performed at a ratio of compression of abut 4-5.

3. Method according to claim 1 including the step of compressing the sheet in the direction of the thickness of the sheet.

4. Method according to claim 1, wherein the heat treated sheet of mineral fibers is cut in a crosswise-direction tot he direction of longitudinal compression.

5. Method according to claim 1, wherein the heat treated felt of mineral fibers is cut in a direction parallel to the direction of longitudinal compression.

6. Method according to claim 1, wherein the sheet is longitudinally rotated 90° prior to said cutting step.

* * * * *